(12) United States Patent
Wang et al.

(10) Patent No.: US 6,419,968 B1
(45) Date of Patent: Jul. 16, 2002

(54) METHOD AND APPARATUS FOR PRODUCING SAUSAGE

(75) Inventors: Pie-yi Wang, Wheaton; James Costelloe, Naperville; Gary L. Moore, Sandwich; Christopher P. Salm, Wheaton, all of IL (US)

(73) Assignee: Swift-Eckrich, Inc., Downers Grove, IL (US)

( * ) Notice: Subject to any disclaimer, the term of this patent is extended or adjusted under 35 U.S.C. 154(b) by 0 days.

(21) Appl. No.: 09/931,364

(22) Filed: Aug. 16, 2001

(51) Int. Cl.[7] .............................. A22C 7/00; A22C 11/00
(52) U.S. Cl. ..................... 426/277; 99/353; 99/535; 426/513; 426/516
(58) Field of Search .................................. 426/513, 516, 426/277, 284, 305, 92, 644; 99/353, 535, 470; 452/71

(56) References Cited

U.S. PATENT DOCUMENTS 5,759,602 A * 6/1998 Kobussen et al. .......... 426/513
5,795,605 A * 8/1998 Morgan et al. ............. 426/513

* cited by examiner

*Primary Examiner*—George C. Yeung
(74) *Attorney, Agent, or Firm*—Christie, Parker & Hale, LLP

(57) ABSTRACT

A method for making sausages comprises coextruding sausage paste and collagen to form a continuous sausage body having an outer tube comprising collagen in surrounding relation to the sausage paste. The continuous sausage body is separated into individual sausage links, each having an exterior surface. The sausage links are transported to an enclosure. The sausage links are loaded into baskets mounted on an endless serpentine belt contained at least in part within the enclosure. The belt is caused to circulate along a serpentine path so that the sausage links are carried boustrophedomically by the baskets through the enclosure, and the baskets are caused to successively change their orientations rotationally as the belt circulates within the enclosure so that different parts of the exterior surface of each sausage link come successively into contact with a concave interior surface of the basket in which that sausage link is carried. Heat is supplied to a selected portion of the enclosure to cook the sausage links. Additionally, the sausage links are treated with natural smoke in a selected portion of the enclosure. This method produces a round sausage having an even mahogany color using a continuous process, while also minimizing the potential for touch marks on the sausage.

36 Claims, 8 Drawing Sheets

METHOD AND APPARATUS FOR PRODUCING SAUSAGE

BACKGROUND

Traditionally, sausages have been prepared by extruding sausage paste or meat into a prepared sausage casing. Such casings have usually been prepared from sheep or pig intestines, regenerated cellulose or regenerated collagen. This method of preparation is particularly disadvantageous because there is no way to continuously stuff a prepared food casing. As a result, stuffing of prepared food casings is a batch operation. More recently, this problem has been overcome by coextruding a collagen gel or other casing material along with the sausage paste, and the collagen gel hardens to form the sausage casing.

It is often desirable to smoke the sausage product to impart a smokey flavor and color into the product. The above-described coextrusion method has been used in connection with sausage products that are smoked by treating the products with liquid smoke. Typically liquid smoke is applied to the surface of the sausage product either by showering, atomizing or spraying. Another method of using liquid smoke is to blend it directly into the sausage product, although this methods tends to cause artificially harsh smoke flavors and often fails to impart the most desired smoke color to the surface of the food product. Another disadvantage of liquid smoke is that it tends to be corrosive and, if not applied properly, causes inconsistent flavor and color.

Alternatively, a sausage product can be smoked by treating the product with natural smoke. Natural smoke provides a better smoke flavor to the sausage product than does liquid smoke. However, natural smoke also has disadvantages. Notably, if the outer surface of a sausage product is not completely dry before the natural smoke is applied, the sausage will have a muddy color instead of the desired mahogany color. Additionally, in typical flat belt ovens, the bottom and top surfaces of the sausage dry at different rates and to different extents, so that uniform application of the natural smoke cannot be achieved, thereby resulting in a non-uniform smoky color. Another problem with typical flat belt ovens is that it can be difficult to produce a sausage having a consistent round shape because the surface of the sausage that sits on the belt tends to flatten. Further, the surface of the belt on which the sausage rests creates touch marks on the sausage, which are often undesirable to the consumer. Also, the surface of the sausage is not uniformly exposed to heat, chilled air and cooling showers.

In addition, cellulose casing must be peeled from the product before packaging, creating a large quantity of waste material. Natural casing or regenerated collagen casing products require a process to separate the links from a string of products before packaging. The links separation is labor intensive and can, under some circumstances, result in micro contamination.

Accordingly, a need exists for an improved method for producing sausage whereby the sausage paste can be introduced into the casing using a fully-automated process. The sausage can be treated with natural smoke to achieve the desired smoke color and flavor. The resulting product can have a round shape as well as minimal or substantially no micro contamination.

SUMMARY OF THE INVENTION

The present invention is directed to a method and apparatus for producing sausage. The inventive method and apparatus can overcome the above drawbacks and produce a round sausage having the desired color and less contamination using a fully-automated system. The invention also minimizes the potential for touch marks on the sausage by transporting the sausages in baskets that change orientation during heating.

In one embodiment, the invention is directed to a method for making sausages. The method comprises coextruding sausage paste and collagen to form a continuous sausage body having an outer tube comprising collagen in surrounding relation to the sausage paste. The continuous sausage body is then separated into individual sausage links, each having an exterior surface The sausage links are transported to an enclosure to be heated and smoked. The sausage links are loaded into baskets on an endless belt contained at least in part within the enclosure. The belt can be caused to circulate along a serpentine path so that the sausage links are carried boustrophedonically by the baskets through the enclosure. The baskets can thus be caused to successively change their orientations rotationally as the belt circulates within the enclosure so that different parts of the exterior surface of each sausage link come successively into contact with a concave interior surface of the basket in which that sausage link is carried. Heat is supplied to a selected portion of the enclosure to cook the sausage links. Additionally, the sausage links can be treated with natural smoke in a selected portion of the enclosure.

Another aspect of the invention is directed to an apparatus for processing sausages that are elongated and approximately round in cross-section. The apparatus comprises a coextruder that, in use, is capable of coextruding sausage paste and collagen to form a continuous elongated sausage body having an outer tube comprising collagen in surrounding relation to the sausage paste; means for separating the continuous sausage body into individual sausage links downstream of the coextruder, preferably a crimping device; an enclosure downstream of the separating means; an endless serpentine belt formed in part by a series of generally similar elongated baskets, each oriented generally perpendicular to the direction of travel of the serpentine belt and being capable of changing its orientation rotationally relative to other baskets, each basket having a concave interior surface and a longitudinal opening through which sausage links can enter and exit, and each basket being dimensioned to contain at least one sausage link; one or more conveyor belts for transporting the sausage links between the separating means and the serpentine belt; a plurality of idlers and drive members and at least one motor arranged to cause the serpentine belt to circulate boustrophedonically within the enclosure; a heater for raising the temperature within at least part of the enclosure to cook the sausage links as they are carried by the serpentine belt; and a natural smoke generator to smoke the sausage links as they are carried by the serpentine belt in the enclosure.

DESCRIPTION OF THE DRAWINGS

These and other features and advantages of the present invention will be better understood by reference to the following detailed description when considered in conjunction with the accompanying drawings wherein.

DESCRIPTION OF THE PREFERRED EMBODIMENTS

The present invention is directed to an apparatus and method for processing sausage. In accordance with the inventive method and apparatus, sausages are formed by coextruding sausage paste and collagen to form a continuous elongated and generally cylindrical sausage body, separating the sausage body into links, and introducing the links into baskets mounted on an endless serpentine belt contained, at least in part, in an enclosure. The baskets are connected so that they are capable of successively changing their orientations rotationally as they travel. Within the enclosure, the sausages are heated and treated with natural smoke. The inventive apparatus and method more evenly heats the sausages, permitting more even color distribution when using natural smoke, and minimizes touch marks on the sausages during heating. The resulting sausage products also maintain the rounded shape created during the extrusion process because the sausages are not dried and cooked on a flat belt.

Figure 1:
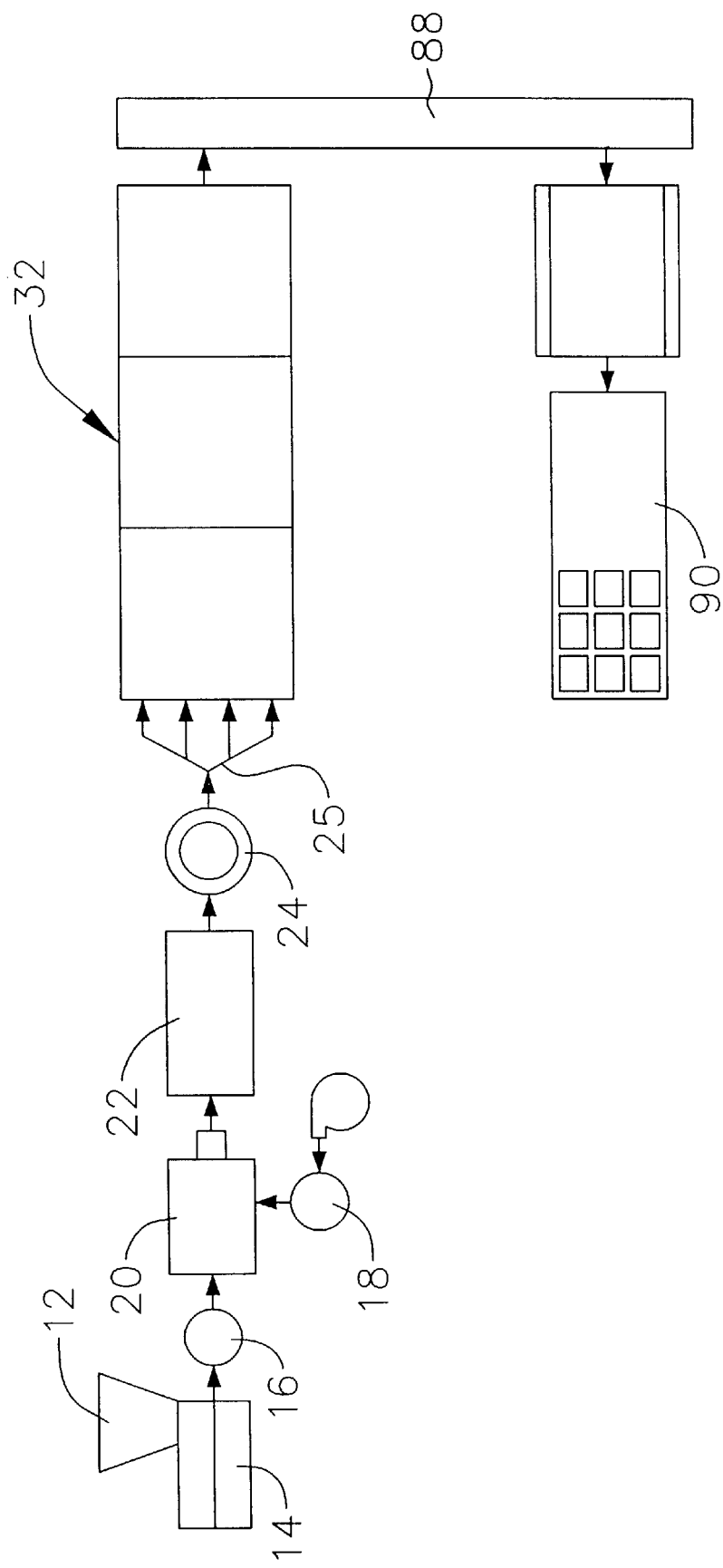
FIG. 1 is a flowchart showing a preferred exemplary method according to the invention.

To produced the sausage paste, any meat suitable for use in a sausage product can be employed. The meat can be fresh (i.e., uncooked) or precooked. As shown in FIG. 1, the meat is introduced into a meat hopper 12 and subjected to vacuum. A meat pump 14 pumps the meat from the hopper 12 to a meat grinder 16 to produce a sausage paste. One suitable pump and meat grinder is the OPTI180, which is commercially available from Marlen Research Corporation (Overland Park, Kans.). The meat grinder 16 reduces the particle size ofthe meat, preferably to about 1 mm to about 10 mm, more preferably to about 3 mm to about 5 mm.

The sausage casing can be formed from any suitable dough, such as vegetable protein or starch, and is preferably formed from a collagen dough. The particular collagen dough or other dough used can be selected based on the desired characteristics of the finished product. Preferably the collagen dough is regenerated from beef hide, as is generally known in the art. An example of a suitable for dough for use in the present invention is Nippi Collagen Dough, available from Nippi Collagen Inndustries, Ltd. (Tokyo, Japan). The collagen dough is provided in a vat (not shown) and then transferred to a collagen hopper 18 for processing. If desired, a cross-linker can be added to the collagen dough prior to extrusion of the dough and sausage paste.

The sausage paste and collagen dough are pumped or otherwise introduced to the coextruder 20. The coextruder 20 extrudes the sausage paste into a traditional generally-cylindrical sausage shape. The collagen dough is coextruded simultaneously with and in surrounding relation to the sausage paste. The resulting product is a continuous sausage body having an outer tube comprising collagen dough in surrounding relation to the sausage paste. Preferably the coextruder 20 has an orifice (not shown) that can be set to produce sausage bodies of different diameters. A suitable coextruder for use in connection with the present invention is the Kontura System, which is commercially available from Townsend Engineering Company (Desmoines, Iowa). Details regarding coextruders can be found in U.S. Pat. Nos. 5,843,504 and 6,054,155, the disclosures of which are incorporated herein by reference. The relative amounts of collagen dough and sausage paste are selected so that the collagen dough is present in an amount preferably ranging from about 2 to 8 wt %, more preferably ranging from about 3 to 6 wt %, based on the total weight of the sausage paste.

Thereafter, the meat surrounded by the collagen dough is passed through a brine system 22, such as a brine bath or a brine drench, where the dough is set with a brine solution. The brine solution sets the collagen dough on the sausage body to form a collagen casing. A suitable brine drench system for use in connection with the present invention is included as a component of the Townsend Kontura system. The brine solution preferably comprises sodium chloride or dipotassium phosphate in water. Dipotassium phosphate brine is particularly preferred because of its high solubility and low flavor effect. The concentration of dipotassium phosphate preferably is at least about 20% by weight, more preferably at least about 40% by weight, to saturation, based on the weight of the brine solution. The temperature of the brine solution preferably ranges from about 50° F. to about 95° F., more preferably from 60° F. to about 80° F.

After the casing is at least partially set in the brine solution, the sausage body is introduced to a suitable crimping device 24, such as a crimping wheel, to separate the sausage body into sausage links. A suitable crimping device for use in connection with the present invention is included as a component of the Townsend Kontura system. Preferably, the crimping device 24 can be modified to alter the length of the sausage links. The links can have any suitable length, which preferably ranges from about 1 inch to about 12 inches, more preferably from about 2 inches to about 8 inches.

Figure 2:
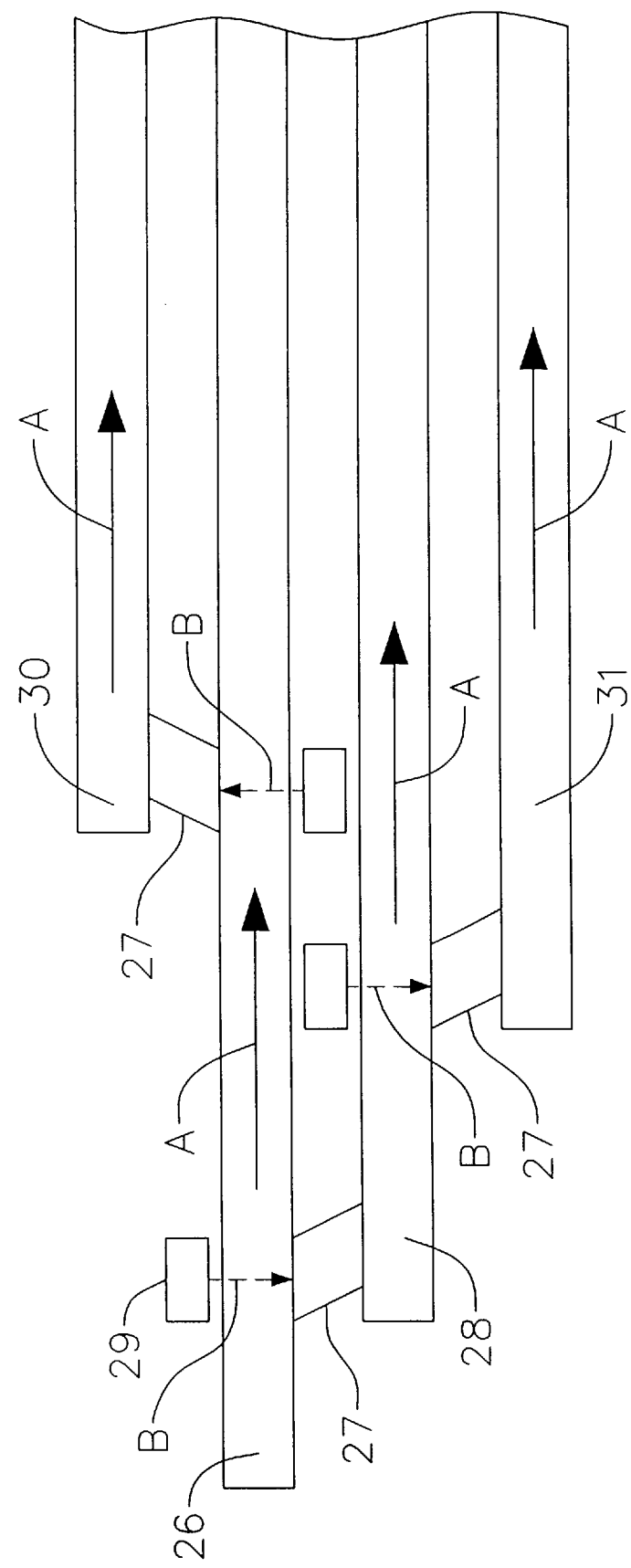
FIG. 2 is a schematic view of a preferred exemplary sausage link transfer system according to the invention.

The sausage links that come off the crimping device 24 are introduced onto a transfer system 25 comprising one or more suitable transfer belts to be passed to a loading device that loads the sausage links into the baskets of the enclosure. The links are preferably loaded onto one or more parallel transfer belts end-to-end so that their length is generally aligned with the direction of travel of the transfer belt(s). Preferably, the one or more transfer belts are each generally V-shaped, i.e., have a generally V-shaped cross-sectional area formed by two inclined belt sections, so that the sausage links do not roll off while being transported. In a preferred embodiment, as shown in FIG. 2, all of the sausage links are loaded onto a single primary conveyor belt 26. The primary conveyor belt 26 carries the sausage links in one general direction, as indicated by arrows A. From the primary conveyor belt 26, approximately half of the sausage links are diverted onto a secondary conveyor belt 28, which is located generally alongside of and slightly below the primary conveyor belt 26.

A sloping transfer plate 27 is positioned between the primary and secondary conveyor belts. An air nozzle 29 is positioned near the sloping transfer plate 27. The nozzle 29 selectively releases compressed air in a perpendicular direction across the primary conveyor belt 26, as indicated by arrow B. If no compressed air is released when the sausage link passes the air nozzle 29, the link continues on the primary conveyor belt 26 in its original direction. However, if compressed air is released as a sausage link passes the nozzle 29, the link rolls across the sloping transfer plate 27 and onto the secondary conveyor belt 28. By activating the compressed air as alternating sausage links pass, or any other pattern of activation, the system produces two separate, single file rows of sausage links. The system can include conveyor belts and air nozzles repeated at numerous locations to produce any desired number of single file rows of sausage links. In a particularly preferred embodiment, the system is designed so that the sausage links are further diverted in part from the primary conveyor belt 26 to a tertiary conveyor belt 30 and from the secondary conveyor belt 28 to a quaternary conveyor belt 31 so that the sausage links ultimately travel along one of four parallel conveyor belts for introduction into one of four adjacent baskets 36 in the heating and cooling enclosure 32, as described further below.

The heating and cooling enclosure 32 preferably comprises at least one drying compartment, at least one smoking compartment, at least one cooking compartment, and at least one cooling compartment. Within the drying compartment, the sausage links are subjected to elevated temperatures to dry the links, preferably a temperature ranging from about 100° F. to about 200° F., more preferably from about 120° F. to about 180° F. Within the smoking compartment, the sausage links are treated with natural smoke using a suitable natural smoke generator also at an elevated temperature preferably ranging from about 120° F. to about 190° F., more preferably from about 130° F. to about 170° F. Within the cooking compartment, the smoked sausage links are further heated at an elevated temperature, preferably ranging from about 150° F. to about 190° F. Thereafter, the sausage links are cooled in the cooling compartment. Preferably at least two cooling compartments are provided. The first cooling compartment houses a water shower at a temperature preferably ranging from about 40° F. to about 70° F. In the second cooling compartment, the sausage links are further cooled with chilled air at a temperature preferably ranging from about 10° F. to about 50° F., more preferably from about 20° F. to about 30° F.

By increasing the number of compartments, the speed at which the sausage links pass through the enclosure can be increased. In a preferred embodiment, the heating and cooling enclosure 32 comprises thirteen compartments in series through which each sausage link passes, namely, three drying compartments, four smoking compartments, one cooking compartment, and five cooling compartments.

Figure 3:
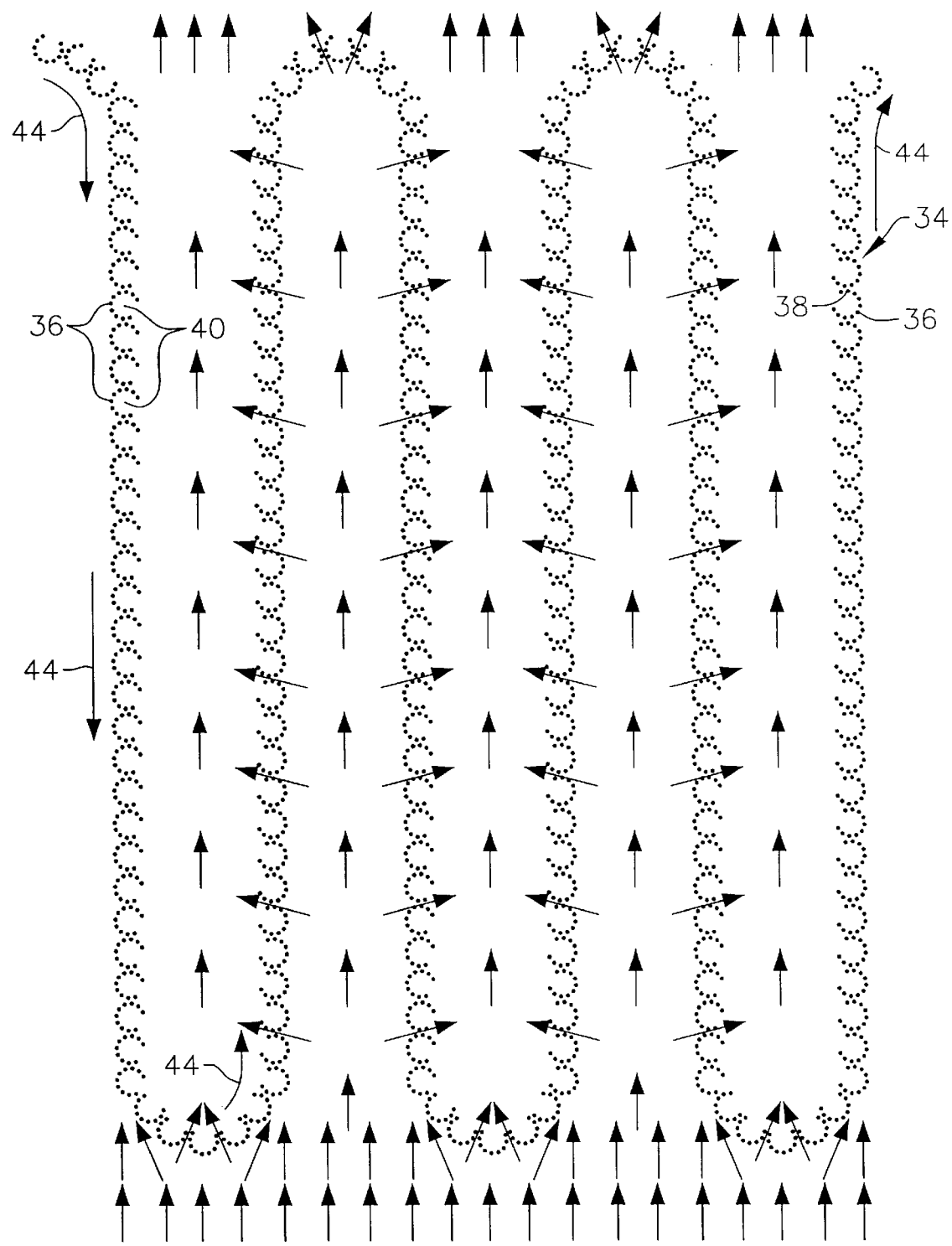
FIG. 3 is a schematic view of a portion of the serpentine belt according to the invention.

Within the enclosure 32 is an endless serpentine belt 34 formed in part by a series of elongated baskets 36 that are generally similar in size and shape, as depicted in FIG. 3. The serpentine belt 34 comprises an two parallel elongated chains that continuously passes through each of the compartments of the enclosure 32 at a generally steady rate. A plurality of idlers, drive members and at least one motor (not shown) are provided to cause the serpentine belt 34 to circulate boustrophedonically within the enclosure 32.

Figure 4A:
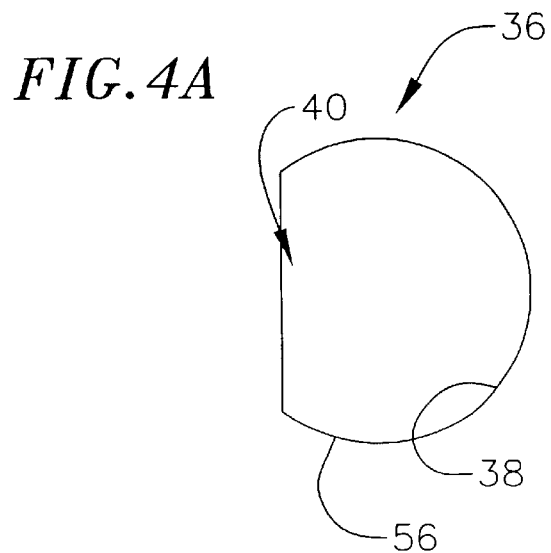
FIGS. 4A, 4B and 4C are end, front and back views, respectively, of a basket in accordance with the invention.
Figure 4B:
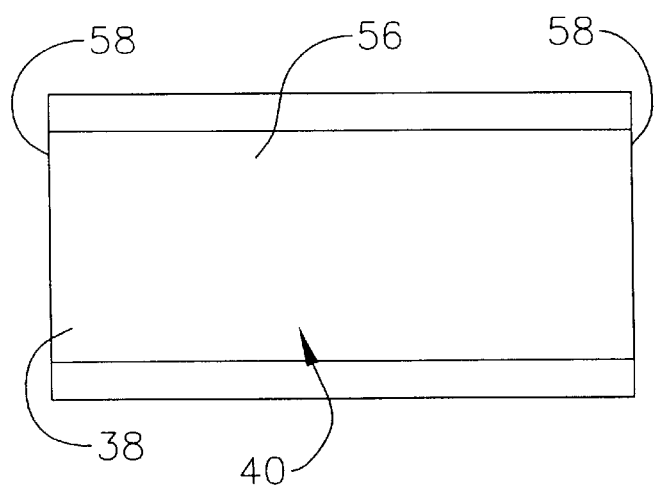
Figure 4C:
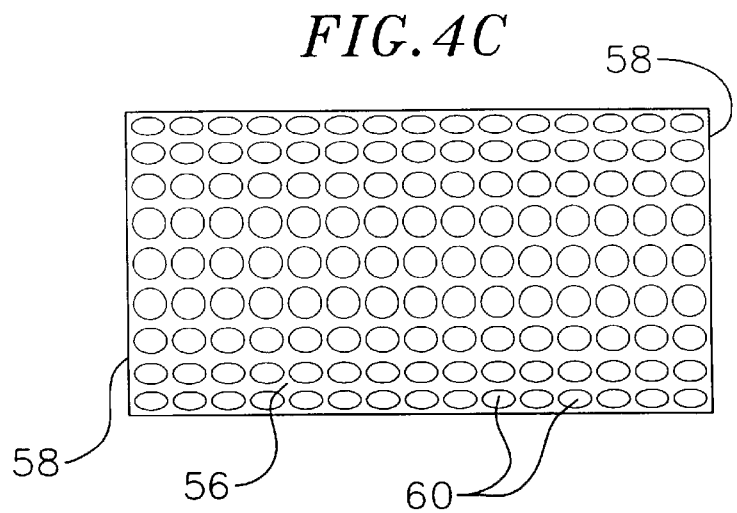

As shown in FIGS. 4A, 4B and 4C, each basket 36 on the serpentine belt 34 has a concave interior surface 38 for holding one or more sausage links and a longitudinal opening 40 through which sausage links can be introduced to and removed from the basket. In the depicted embodiment, each basket 36 is generally cylindrical, except for the longitudinal slot-like opening 40 in the basket, with closed ends 42, so that each basket has a generally C-shaped cross-sectional area. Preferably the concave interior surface 38 of each basket 36 is a continuous rounded surface, although other suitable designs can be employed so that the sausage links can roll within the basket as the orientation of the basket changes, as described further below. For example, the concave interior surface can be formed by a plurality of adjacent flat surfaces over which sausage links can roll as the orientation of the basket changes.

Each basket 36 is oriented so that its length is generally perpendicular to the direction of travel of the belt 34, as indicated by arrows 44 in FIG. 4. The longitudinal opening 40 is on the side of basket 36 that faces generally outward, for reasons that will become apparent.

Figure 5:
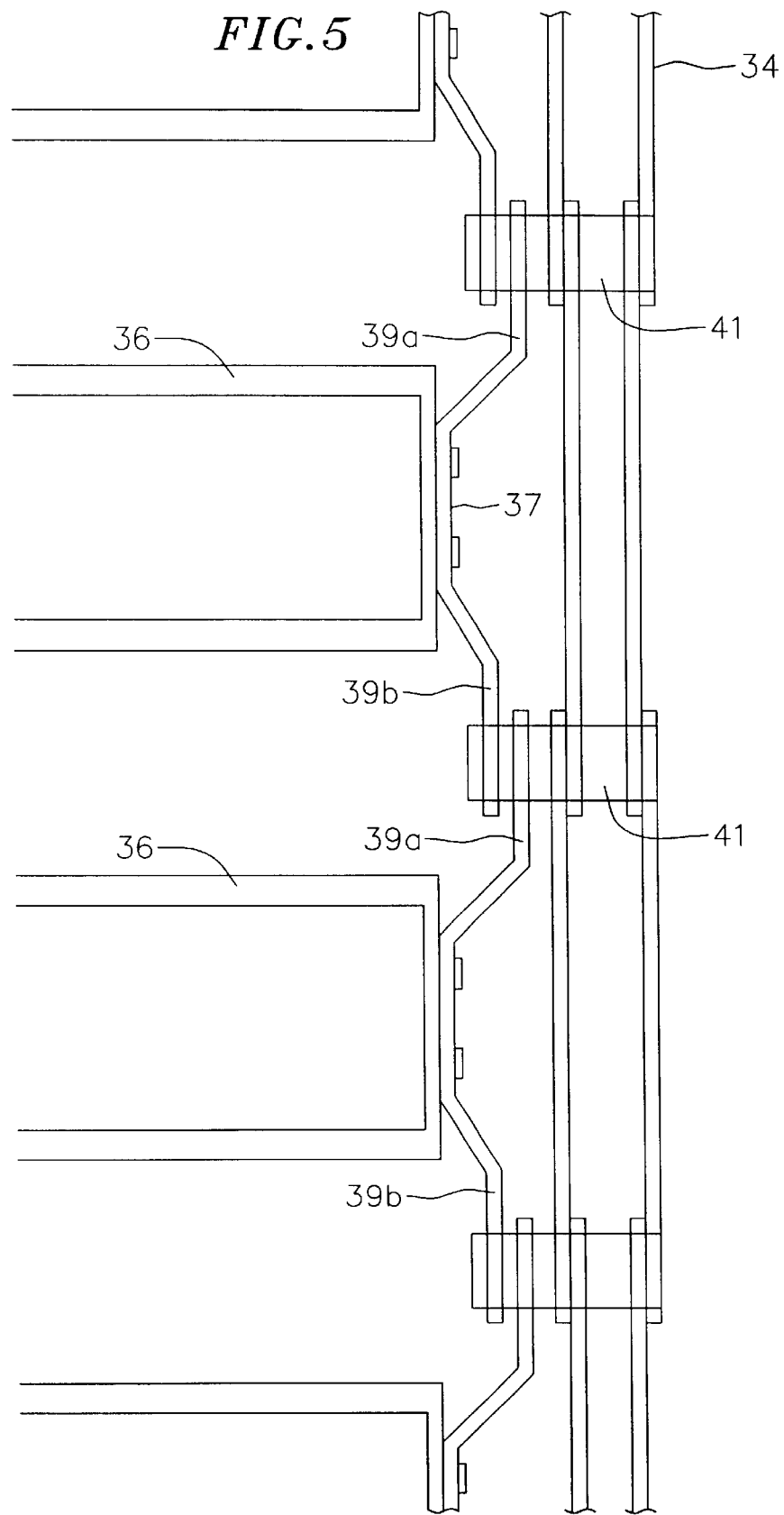
FIG. 5 is a side view of baskets mounted on the serpentine belt.

Each basket 36 can be mounted on the chains of the serpentine belt 34 in any suitable manner. In a particularly preferred embodiment, each basket 36 has two ends with a mounting bracket 37 spot welded to each end. FIG. 5 depicts the ends of several baskets mounted on one of the chains of the serpentine belt 34. Each mounting bracket 37 has a top end 39a and a bottom end 39b, with a hole extending through each end. Chain roller pins 41 connect the mounting brackets 37 to the chain of the serpentine belt 34. Specifically, a chain roller pin 41 extends through a hole of the bottom end 39b of one mounting bracket, through a hole of the top end of a mounting bracket of an adjacent basket, and through two holes of the chain of the serpentine belt 34. The elongated chains that form the serpentine belt 34 are attached to each end of each basket 37 and are precisely guided throughout the oven to maintain a fixed distance between the baskets with the use of chain guides (not shown). In the depicted embodiment, the top end 39a of each bracket 37 extends farther from the basket 36 than the bottom end 39b of that basket, and similarly farther from the basket than the bottom end of the adjacent basket. Accordingly, the ends of the mounting brackets 37 alternate, as shown in FIG. 5. This design permits each basket 36 to be mounted without being captured by any hardware. The mounting brackets 37 are allowed to float on the chain roller pins 41 and move slightly to allow for expansion and contraction. However, the movement of the chains is limited by guides (not shown) so that the two parallel chains of the serpentine belt never move far enough apart to allow the brackets 37 to fall of the chain roller pins 41. Preferably the baskets 37 are allowed to slide approximately ½" horizontally without the holes in the mounting bracket 37 reaching the ends of the chain roller pins 41.

If the chain guides are misadjusted too wide, a brackets could slide beyond its corresponding pin, allowing that end of the basket to fall off the chain. If the chain guides are too close together, the baskets will be pinched between the chains and bind. This condition could cause major damage and possible chain breakage, but the serpentine chain drive mechanism is preferably protected by an adjustable clutch.

Figure 6:
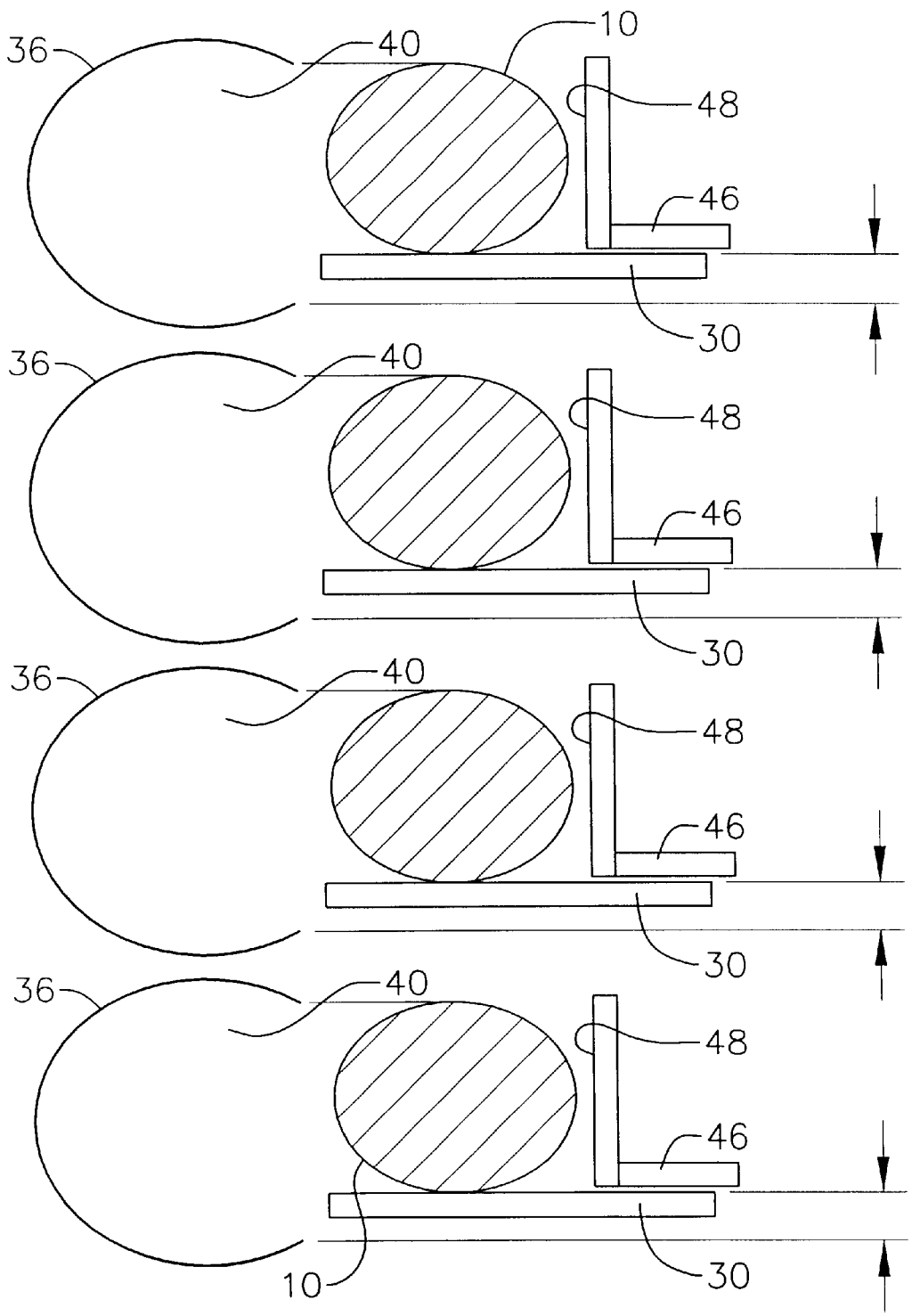
FIG. 6 is a schematic view of a preferred loading mechanism in accordance with the invention.

From each of the four conveyor belts 26, 28, 29 and 30, the sausage links are loaded into the baskets 36, one basket at a time. As shown in FIG. 6, the serpentine belt 34 is positioned with four baskets 36 aligned with the four conveyor belts 26, 28, 29 and 30 so that the sausage links 10 on the conveyor belts are generally parallel to the longitudinal openings 40 of the baskets. The baskets 36 should be level and parallel with the four conveyor belts to minimize the loading jam.

Four pushers 46, each corresponding to a different conveyor belt, push the sausage links 10 in a direction perpendicular to the direction of travel of the conveyor belts and into the longitudinal openings 40 of the baskets 36. Each pusher 46 comprises an elongated vertical sausage contact surface 48 that is generally perpendicular to the surface of the corresponding conveyor belt 30. The elongated vertical surface 48 is pushed against one or more sausage links 10, which are positioned on the conveyor belt 30 end-to-end, to load a sausage link into a basket 36. Each pusher 46 is individually activated by a proximity sensor (not shown) that identifies a specific basket 36 for loading.

Each pusher 46 is an approximately 60 inches wide, formed of angled 16 gauge stainless steel with the vertical sausage contact surface 48 being approximately two inches high. The horizontal component of each angled pusher is about three inches wide and serves as the pivot arm and actuator mounting surface. The actuator consists of an approximately ½" diameter stainless round rod with adjustable length rod end bearing mounted on each end. One rod end bearing is connected to the angle pusher via a pivot arm and the other is connected to an eccentric cam. The eccentric cam is shaft mounted on a servo motor which rotates one revolution for each basket loading cycle. The rotation of the eccentric can converts the servo motors rotary motion into a linear motion of the actuator rod. The rod in turn moves the pivot arm which changes the direction of motion 90 degree, thus moving the angle pusher horizontally which contacts th adjacent row of sausages and pushes them into the continuously, vertical moving baskets. As will be recognized by one skilled in the art, the precise number of parallel conveyor belts 30 and pushers 46 can vary as desired.

Each basket 36 is articulated for movement relative to other baskets, so that, as the serpentine belt 34 changes direction, the orientation of a basket on the belt similarly changes relative to the orientations of other baskets. By this design, the longitudinal opening 40 of each basket 36 will always face upwardly, to the side, or somewhere in between, and never downwardly. As the orientation of a basket changes, a sausage link contained within that basket will roll due to the force of gravity to the lowest point within the basket. In the depicted embodiment, each basket 36 changes its orientation relative to the adjacent baskets on either side. Alternatively, the baskets can be mounted on the serpentine belt 34 in groups so that two or more baskets 36 can change their orientation together relative to two or more other adjacent baskets. Preferably the serpentine belt 34 is designed so that each sausage is rotated at least four, and preferably six, times in each compartment, although this design can vary, e.g., based on the number of compartments in the enclosure.

Figure 7:
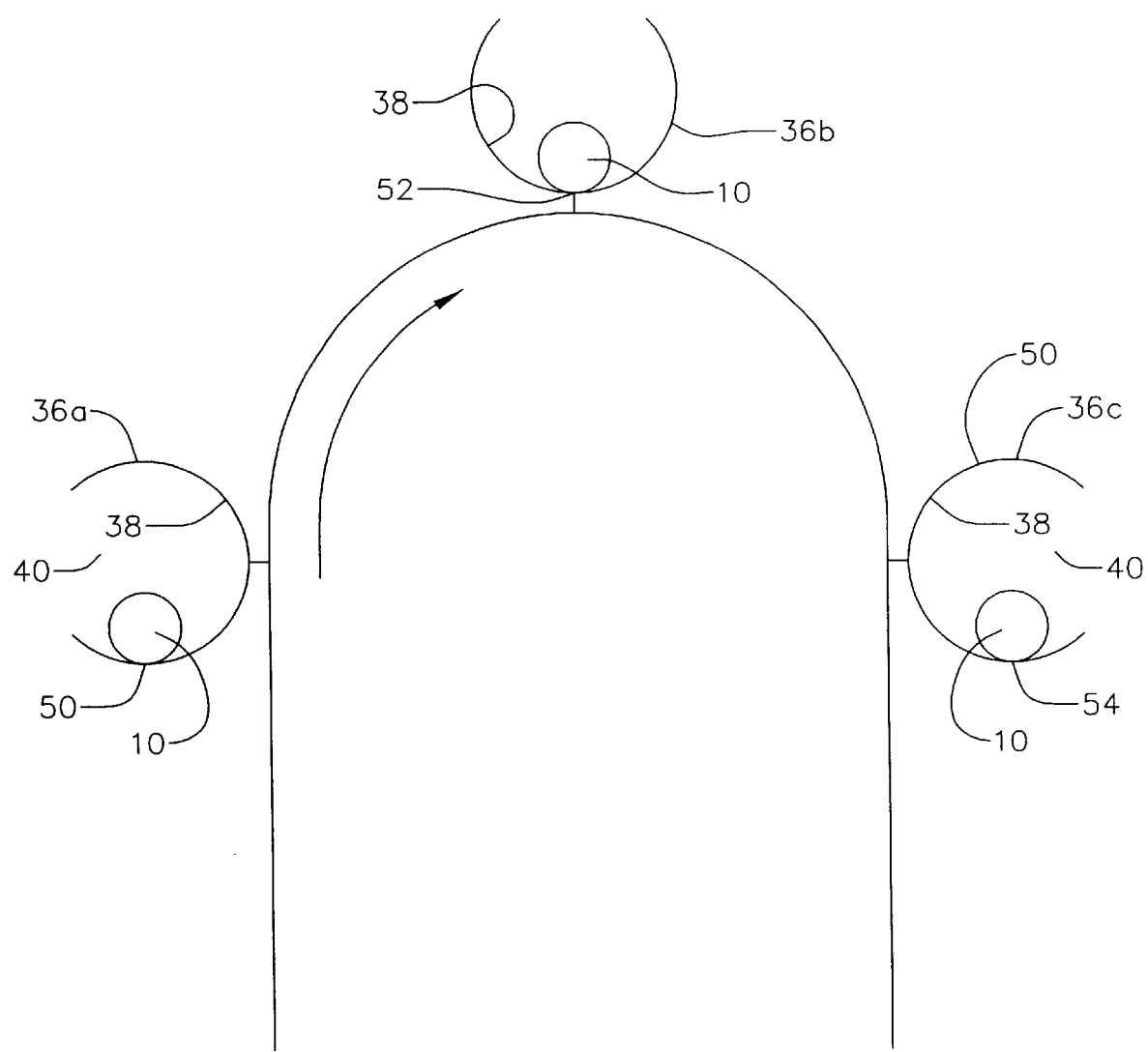
FIG. 7 is a schematic detailed view of a portion of the serpentine belt according to the invention depicted how the sausages rotate as the baskets change orientation.

FIG. 7 depicts an example of the manner in which a sausage link 10 moves rotationally relative to the basket 36 in which it is contained as the orientation of that basket changes. In a first position, the basket 36a is moving upwardly on the serpentine belt 34 with its longitudinal opening 40 facing sideways. The sausage link 10 contained within the basket 36a sits on a first side 50 of the concave interior surface of the basket that is the lowest interior surface of the basket. In a second position, the basket 36b has reached the top of the path of the serpentine belt 34 and is moving generally sideways on the belt with its longitudinal opening 40 facing upwardly. The sausage link 10 contained within the basket 36b now sits at approximately the midsection 52 of the concave interior surface 38, which is the lowest interior surface of the basket in this position. In a third position, the basket 36c is moving downwardly on the serpentine belt 34 with its longitudinal opening 40 facing sideways, but in a direction opposite the longitudinal opening of the basket 30a in the first position. The sausage link 10 contained within the basket 30c now sits on a second side 54 of the concave interior surface 38 opposite the first side 50 on which the sausage link rested in the first position. By this arrangement, the outer surface of the sausage link 10 in contact with the concave interior surface 38 of the basket 36 changes over time, thereby minimizing burning of the outer surface of the link. Additionally, by rotating the sausage links throughout the enclosure, the sausages are heated and cooled more evenly and efficiently. Notably, the links can be dried more evenly, thereby producing a more uniform color upon treatment with the natural smoke without touch marks.

Each basket 36 is preferably formed from one or more thin sheets of suitable metal, such as stainless steel, that form the curved main wall 56 and straight end walls 58 of the basket, as shown in FIGS. 4A, 4B and 4C. The curved main wall 56 of the basket 36 contains a plurality of openings 60, through which heat, smoke, water and air can pass to contact the one or more sausage links 10 within the basket. Preferably the openings 60 occupy from about 30% to about 80%, more preferably from about 50% to about 70%, still more preferably about 60% of the surface of the curved main wall 56. Preferably the openings 60 are evenly spaced over the surface of the curved main wall 56, and they preferably comprises equally-sized circles or ovals with diameters of approximately 5 mm. The longitudinal opening 40 preferably extends the entire length of the basket 36. The length of each basket 36 is not critical and can depend on the size of links to be processed and the number of links to be carried in each basket. Preferably the baskets 36 are of equal length, and all have a length ranging from about 40 inches to about 70 inches. In a particularly preferred embodiment, the baskets all have a length of about 59 to 60 inches. In this embodiment, preferably eight six-inch links are carried in each basket, with a spacing of approximately 2 inches at each end of the basket and of approximately 0.75 inch between the links.

Figure 8:
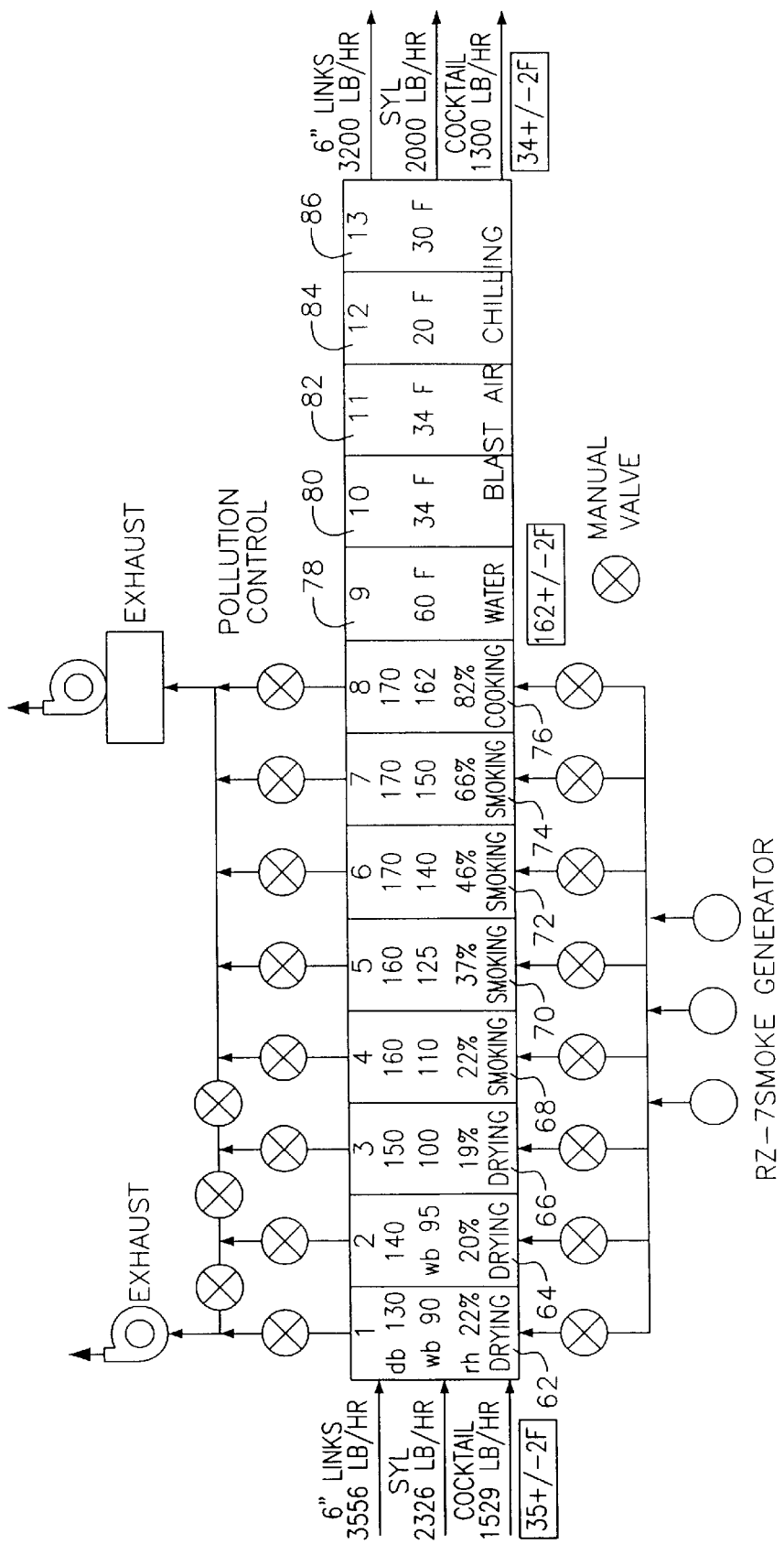
FIG. 8 is a schematic view of the heating and chilling enclosure according to the invention.

A particularly preferred embodiment is shown in FIG. 8. Specifically, sausage links having a length of approximately 6 inches and a weight of approximately 76 grams are introduced into the first compartment 62 at a temperature of about 35±2° F. The links are dried in the first compartment 62, second compartment 64 and third compartment 66 at an elevated temperature of approximately 130° F., 140° F., and 150° F., respectively. Thereafter, the links are treated with natural smoke using an RZ-7 Smoke Generator, which is commercially available from Wilhelm Fessmann GmbH & Co. (Winnenden, Germany), in the fourth compartment 68, fifth compartment 70, sixth compartment 72, and seventh compartment 74, at approximately 160° F., 160° F., 170° F. and 170° F., respectively. Next the links are cooked in the eighth compartment 76 at a temperature of about 170° F. The links are then cooled, first by being subjected to a water shower at a temperature of about 60° F. in the ninth compartment 78. In the tenth compartment 80, eleventh compartment 82, twelfth compartment 84 and thirteenth compartment 86, the links are further cooled with chilled air at a temperature of approximately 34° F., 34° F., 20° F. and 20° F. The final temperature of the links is approximately 34±2° F. The serpentine belt 34 and baskets 36 carried thereon travel at a rate of approximately 8 to 9, more preferably about 8.3, feet/minute. This corresponds to a rate of approximately 3560 lb of sausage/hour before drying and to a rate of approximately 3200 lb of sausage/hour after the cooling process is complete, resulting in a production rate of approximately 3200 lb of sausage/hour. More specifically, the sausage links are dried for approximately 25 minutes, smoked for approximately 33 minutes, cooked for approximately 8 minutes, cooled with water for approximately 8 minutes, and cooled with chilled air for approximately 33 minutes, for a total processing time of approximately 107 minutes.

After the sausage links have been dried, smoked, cooked and chilled in the enclosure, they are discharged onto a transfer system 88 by rotating each basket 36 so its longitudinal opening 40 is facing downward. With a basket 36 in this position, the sausage link or links in the basket fall from the opening 40 of the basket due to the force of gravity. Each falling sausage link drops onto a conveyor belt 88 that transfers all of the links to a packaging machine. Any suitable packaging machine can be used in accordance with the invention. In a particularly preferred embodiment, the packaging machine comprises a Drake loader commercially available from F. R. Drake Company (Waynesboro, Va.). The sausage links are loaded in three parallel lines, each line having six links per index. A pusher then pushes six sausage links into a pocket of the form-fill-seal packaging machine.

The preceding description has been presented with reference to presently preferred embodiments of the invention. Workers skilled in the art and technology to which this invention pertains will appreciate that alterations and changes in the described apparatus and method may be practiced without meaningful departing from the principal, spirit and scope of this invention. Accordingly, the foregoing description should not be read as pertaining only to the precise methods and apparatus described and illustrated in the accompanying drawings, but rather should be read consistent with and as support to the following claims which are to have their fullest and fair scope.

What is claimed is:

1. A method for making sausages comprising:
   coextruding sausage paste and collagen dough to form a continuous sausage body having an outer tube comprising collagen dough in surrounding relation to the sausage paste;
   separating the continuous sausage body into individual sausage links, each having an exterior surface;
   transporting the sausage links to an enclosure;
   loading the sausage links into baskets mounted on an endless belt contained at least in part within the enclosure;
   causing the belt to circulate along a serpentine path so that the sausage links are carried boustrophedonically by the baskets through the enclosure;
   causing the baskets to successively change their orientations rotationally as the belt circulates within the enclosure so that different parts of the exterior surface of each sausage link come into contact with a concave interior surface of the basket in which that sausage link is carried;
   supplying heat to a selected portion of the enclosure to cook the sausage links; and
   treating the sausage links with natural smoke in a selected portion of the enclosure.

2. The method of claim 1, wherein the sausage paste is uncooked when being extruded.

3. The method of claim 1, further comprising unloading the cooked and smoked sausage links onto a conveyor, transporting the sausage links on the conveyor to a packaging station and packaging the sausage links.

4. The method of claim 1, wherein a cross-linking agent is added to the collagen before the collagen is extruded with the sausage paste.

5. The method of claim 1 wherein only one sausage link is loaded into each basket.

6. The method of claim 1 wherein more than one sausage link is loaded into each basket.

7. The method of claim 1 wherein the serpentine belt travels through a series of separated compartment within the enclosure, the separated compartments comprising at least one drying compartment, at least one smoking compartment, at least one cooking compartment and at least one chilling compartment.

8. The method of claim 7, wherein each basket is rotated at least four times in each compartment.

9. The method of claim 1, wherein the continuous sausage body is crimped to form the individual sausage links.

10. The method of claim 9, further comprising applying brine to the continuous sausage body before the body is crimped.

11. The method of claim 1, wherein each basket is generally cylindrical with a longitudinal opening along at least a portion of its length.

12. The method of claim 1, wherein each basket has an outer wall containing a plurality of openings over its surface.

13. The method of claim 12, wherein the openings occupy from about 30% to about 80% of the surface of the outer wall.

14. The method of claim 1, wherein each basket has a length ranging from about 40 inches to about 70 inches.

15. The method of claim 1, wherein the endless belt comprises two chains and movement of the chains relative to the baskets is limited by one or more guides along the serpentine path.

16. The method of claim 15, wherein each basket has two ends with a mounting bracket attached to each end in generally perpendicular relation to the basket, each mounting bracket having a top end and a bottom end with a hole extending through each of the top end and the bottom end, and further wherein each end of mounting bracket is attached to the chains of the serpentine belt by a pin that extends through the hole in that end of the mounting bracket.

17. The method of claim 16, wherein a single pin extends through the bottom end of a mounting bracket of one basket and the top end of a mounting bracket of an adjacent basket.

18. The method of claim 17, wherein the mounting brackets are slidably attached to the pins.

19. The method of claim 1, wherein the sausage links are transported to the enclosure on one or more V-shaped transfer belts.

20. The method of claim 1, wherein the sausage links are transported to the enclosure on at least two parallel transfer belts.

21. The method of claim 20, wherein:
    the sausage links, after being separated, are all transported on a first transfer belt; and thereafter, a portion of the sausage links are diverted onto a second parallel transfer belt and the remainder Of the sausage links remain on the first transfer belt.

22. The method of claim 21, further comprising:
    diverting a portion of the sausage links remaining on the first transfer belt onto a third parallel transfer belt; and
    diverting a portion of the sausage links from the second transfer belt onto a fourth parallel transfer belt.

23. The method of claim 1, wherein the sausages are transported to the enclosure on four parallel transfer belts.

24. An apparatus for processing sausages that are elongated and approximately round in cross-section comprising:
    a coextruder that, in use, is capable of coextruding sausage paste and collagen to form a continuous sausage body having an outer tube comprising collagen in surrounding relation to the sausage paste;
    means for separating the continuous sausage body into individual sausage links downstream of the coextruder;
    an enclosure downstream of the separating means;
    an endless serpentine belt formed in part by a series of generally similar elongated baskets, each oriented generally perpendicular to the direction of travel of the serpentine belt and being capable of changing its orientation rotationally relative to other baskets, each basket having a concave interior surface and a longitudinal opening through which sausage links can enter and exit, and each basket being dimensioned to contain at least one sausage link;

one or more conveyor belts for transporting the sausage links between the separating means and the serpentine belt;

a plurality of idlers, and drive members and at least one motor arranged to cause the serpentine belt to circulate boustrophedonically within the enclosure;

a heater for raising the temperature within at least part of the enclosure to cook the sausage links as they are carried by the serpentine belt; and a natural smoke generator to smoke the sausage links as they are carried by the serpentine belt within the enclosure.

25. The apparatus of claim 24, wherein the separating means comprises a crimping device.

26. The apparatus of claim 24, wherein the enclosure comprises a series of separated compartments comprising at least one drying compartment, at least one smoking compartment, at least one cooking compartment and at least one chilling compartment.

27. The apparatus of claim 24, wherein each basket is generally cylindrical with a longitudinal opening along at least a portion of its length.

28. The apparatus of claim 24, wherein each basket has an outer wall containing a plurality of openings over its surface.

29. The apparatus of claim 28, wherein the openings occupy from about 30% to about 80% of the surface of the outer wall.

30. The apparatus of claim 24, wherein each basket has a length ranging from about 40 inches to about 70 inches.

31. The apparatus of claim 24, wherein the endless belt comprises two chains and movement of the chains relative to the baskets is limited by one or more guides along the serpentine path.

32. The apparatus of claim 31, wherein each basket has two ends with a mounting bracket attached to each end in generally perpendicular relation to the basket, each mounting bracket having a top end and a bottom end with a hole extending through each of the top end and the bottom end, and further wherein each end of mounting bracket is attached to the chains of the serpentine belt by a pin that extends through the hole in that end of the mounting bracket.

33. The apparatus of claim 32, wherein a single pin extends through the bottom end of a mounting bracket of one basket and the top end of a mounting bracket of an adjacent basket.

34. The apparatus of claim 33, wherein the mounting brackets are slidably attached to the pins.

35. The apparatus of claim 24, wherein each of the one or more conveyor belts is generally V-shaped.

36. The apparatus of claim 24, wherein the one or more conveyor belts comprises at least two parallel transfer belts.

* * * * *

UNITED STATES PATENT AND TRADEMARK OFFICE
CERTIFICATE OF CORRECTION

PATENT NO.     : 6,419,968 B1
DATED          : July 16, 2002
INVENTOR(S)    : Pie-yi Wang et al.

It is certified that error appears in the above-identified patent and that said Letters Patent is hereby corrected as shown below:

Column 5,
Line 58, replace "42" with -- 58 --

Signed and Sealed this

Fourteenth Day of January, 2003

JAMES E. ROGAN
*Director of the United States Patent and Trademark Office*